(12) United States Patent
Liu

(10) Patent No.: US 9,221,139 B2
(45) Date of Patent: Dec. 29, 2015

(54) TOOL CHANGING MECHANISM FOR MACHINE TOOL

(71) Applicant: Kugi Tech Corp., Taichung (TW)

(72) Inventor: Che Sen Liu, Taichung (TW)

(73) Assignee: Kugi Tech Corp., Daya, Taichung (TW)

( * ) Notice: Subject to any disclaimer, the term of this patent is extended or adjusted under 35 U.S.C. 154(b) by 289 days.

(21) Appl. No.: 13/895,433

(22) Filed: May 16, 2013

(65) Prior Publication Data
US 2014/0342891 A1 Nov. 20, 2014

(51) Int. Cl.
*B23Q 3/155* (2006.01)
*B23Q 3/157* (2006.01)

(52) U.S. Cl.
CPC ........ *B23Q 3/15713* (2013.01); *B23Q 3/15553* (2013.01); *B23Q 3/1554* (2013.01); *Y10T 409/309464* (2015.01); *Y10T 483/176* (2015.01); *Y10T 483/1733* (2015.01); *Y10T 483/1748* (2015.01); *Y10T 483/1752* (2015.01)

(58) Field of Classification Search
CPC .................. Y10T 483/1752; Y10T 483/1755; Y10T 483/1757; Y10T 483/1756; Y10T 483/1767; Y10T 483/1769; B23Q 3/1554; B23Q 3/157; B23C 5/26; B23C 5/265; B23B 31/24; B23B 31/26; B23B 31/30
USPC ................. 483/38, 39, 40, 41, 44, 45, 48, 49; 409/231, 232, 233
See application file for complete search history.

(56) References Cited

U.S. PATENT DOCUMENTS

| | | | | |
|---|---|---|---|---|
| 4,414,732 A | * | 11/1983 | Tomita et al. | 483/7 |
| 4,704,056 A | * | 11/1987 | Babel | 409/233 |
| 4,776,081 A | | 10/1988 | Okunishi et al. | |
| 5,749,819 A | * | 5/1998 | Yan et al. | 483/39 |
| 5,762,594 A | | 6/1998 | Hoppe | |
| 5,816,987 A | * | 10/1998 | Yan et al. | 483/38 |
| 5,980,172 A | * | 11/1999 | Shoda | 409/203 |
| 5,997,455 A | * | 12/1999 | Matsuoka et al. | 483/56 |
| 6,102,840 A | | 8/2000 | Xiao | |
| 7,387,600 B1 | | 6/2008 | Sun et al. | |
| 7,594,882 B1 | | 9/2009 | Xiao | |
| 2006/0196026 A1 | * | 9/2006 | Nakamura et al. | 29/27 R |
| 2007/0286695 A1 | * | 12/2007 | Boisvert | 409/131 |

FOREIGN PATENT DOCUMENTS

JP 2006007331 A * 1/2006

* cited by examiner

*Primary Examiner* — Sunil K Singh
*Assistant Examiner* — Michael Vitale
(74) *Attorney, Agent, or Firm* — Charles E. Baxley

(57) ABSTRACT

A machine tool includes a receptacle extended from a stand, a working spindle rotatably attached to the receptacle and having a chuck device for grasping and releasing a tool member from the working spindle, a follower slidably attached onto the working spindle for actuating the chuck device to selectively grasp or release the tool member, a lever arm having one end pivotally attached to the receptacle with an axle, an actuator attached to the lever arm for actuating the follower to operate the chuck device to grasp and to release the tool member, and a driving device includes a piston for moving the lever arm and the actuator to actuate and move the chuck device to release the tool member.

6 Claims, 8 Drawing Sheets

TOOL CHANGING MECHANISM FOR MACHINE TOOL

BACKGROUND OF THE INVENTION

1. Field of the Invention

The present invention relates to a machine tool, and more particularly to a machine tool including a tool changer or tool changing mechanism for suitably and stably and smoothly replacing and changing tool members or elements to a working spindle and for allowing the tool members or elements to be stably and smoothly and effectively replaced and changed with each other.

2. Description of the Prior Art

Typical machine tools comprise a disc or tool carrier or cartridge including a number of adapters or tool mounts for removably and changeably carrying or supporting tool members thereon, and for selectively or changeably supplying or feeding or fitting the selected tool members to the working spindle of the typical machine tool for changing the tool members from one to the other.

For example, U.S. Pat. No. 4,776,081 to Okunishi et al., U.S. Pat. No. 5,762,594 to Hoppe, U.S. Pat. No. 6,102,840 to Xiao, U.S. Pat. No. 7,387,600 to Sun et al., and U.S. Pat. No. 7,594,882 to Xiao disclose several of the typical tool changers or tool changing mechanisms for machine tools each also comprising a disc or tool carrier or cartridge including a number of adapters or tool mounts for removably and changeably carrying or supporting various tool members thereon and for supplying or feeding or fitting the selected tool members to the working spindle when required, and for allowing the tool elements to be stably and smoothly and effectively replaced and changed with each other to the working spindle of the machine tools.

However, the typical tool changers or tool changing mechanisms for machine tools failed to provide a stabilizing structure or mechanism for stabilizing the tool cartridge and for allowing the tool members to be stably and suitably changed and fitted to the working spindle.

The present invention has arisen to mitigate and/or obviate the afore-described disadvantages of the conventional tool changers or tool changing mechanisms for machine tools.

SUMMARY OF THE INVENTION

The primary objective of the present invention is to provide a machine tool including a tool changer or tool changing mechanism for suitably and stably and smoothly replacing and changing tool members or elements to a working spindle and for allowing the tool members or elements to be stably and smoothly and effectively replaced and changed with each other.

In accordance with one aspect of the invention, there is provided a machine tool comprising a stand, a receptacle provided on the stand, a working spindle rotatably attached to the receptacle and including a chuck device for grasping and releasing a tool member from the working spindle, a follower slidably attached onto the working spindle and moveable up and down relative to the working spindle for actuating the chuck device to selectively grasp or release the tool member, a lever arm including a first end portion pivotally attached to the receptacle with an axle, and includes a second end portion movable up and down relative to the receptacle, an actuator attached to the lever arm for selectively contacting and engaging with the follower and for selectively actuating the follower to operate the chuck device to grasp and to release the tool member from the working spindle, a spring biasing member disposed in the receptacle and engaged with the lever arm for biasing and moving the second end portion of the lever arm upwardly relative to the receptacle and for selectively biasing and moving the actuator away from the follower of the working spindle, and a driving device attached to the receptacle and including a piston for selectively contacting and engaging with the second end portion of the lever arm and for selectively actuating and operating or moving the second end portion of the lever arm downwardly relative to the receptacle to compress the spring biasing member and to force and move the actuator to engage with the follower and to selectively actuate and move the chuck device to release the tool member.

The lever arm includes a wheel rotatably attached to the second end portion of the lever arm for selectively contacting and engaging with the piston of the driving device. The follower includes a peripheral flange extended radially and outwardly therefrom for selectively contacting and engaging with the actuator and for allowing the follower to be actuated and moved up and down along the working spindle by the actuator and the lever arm when the lever arm is pivoted or rotated relative to the receptacle.

The receptacle includes a pivot shaft, a detecting wheel attached to the pivot shaft and rotated in concert with the pivot shaft, and a sensor or detector or control device disposed beside the detecting wheel for detecting a rotational movement of the pivot shaft and the detecting wheel and for selectively actuating the piston of the driving device to engage with the second end portion of the lever arm.

The receptacle includes a tool cartridge for supporting at least one spare tool element thereon, and a beam supported between the tool cartridge and the working spindle for selectively moving the spare tool element to the working spindle in order to change or to replace the tool member. The receptacle includes a motor attached to the receptacle and coupled to the beam for moving or pivoting or rotating the beam relative to the receptacle and the working spindle in order to move the tool member and the spare tool element toward or away from the working spindle.

The receptacle includes another control device disposed beside the detecting wheel for detecting a rotational movement of the pivot shaft and the detecting wheel and for selectively actuating the motor to operate the beam to move the tool member and the spare tool element toward or away from the working spindle and to change or to replace the tool member and the spare tool element with each other.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
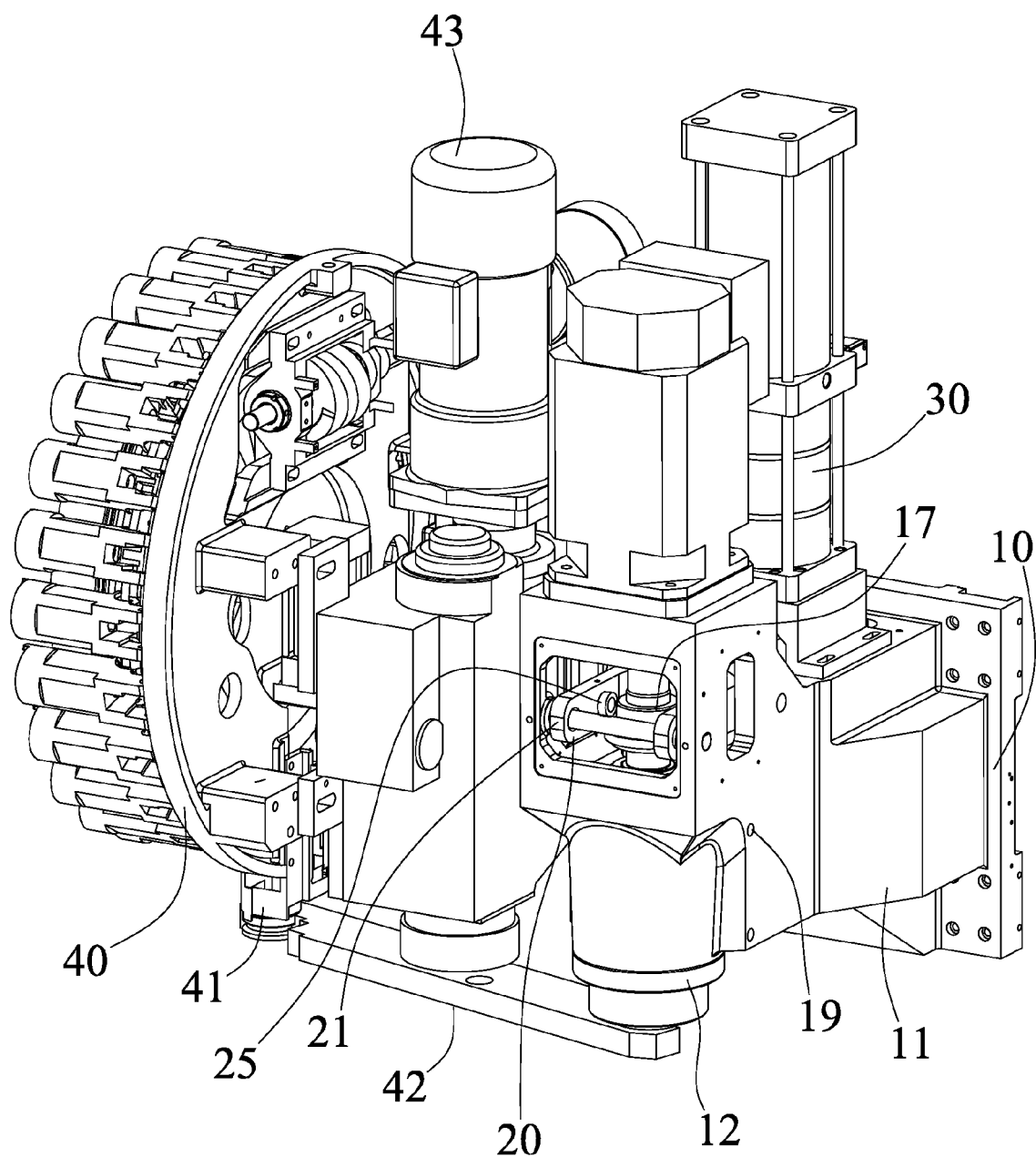
FIG. 1 is a perspective view of a machine tool in accordance with the present invention.
Figure 2:
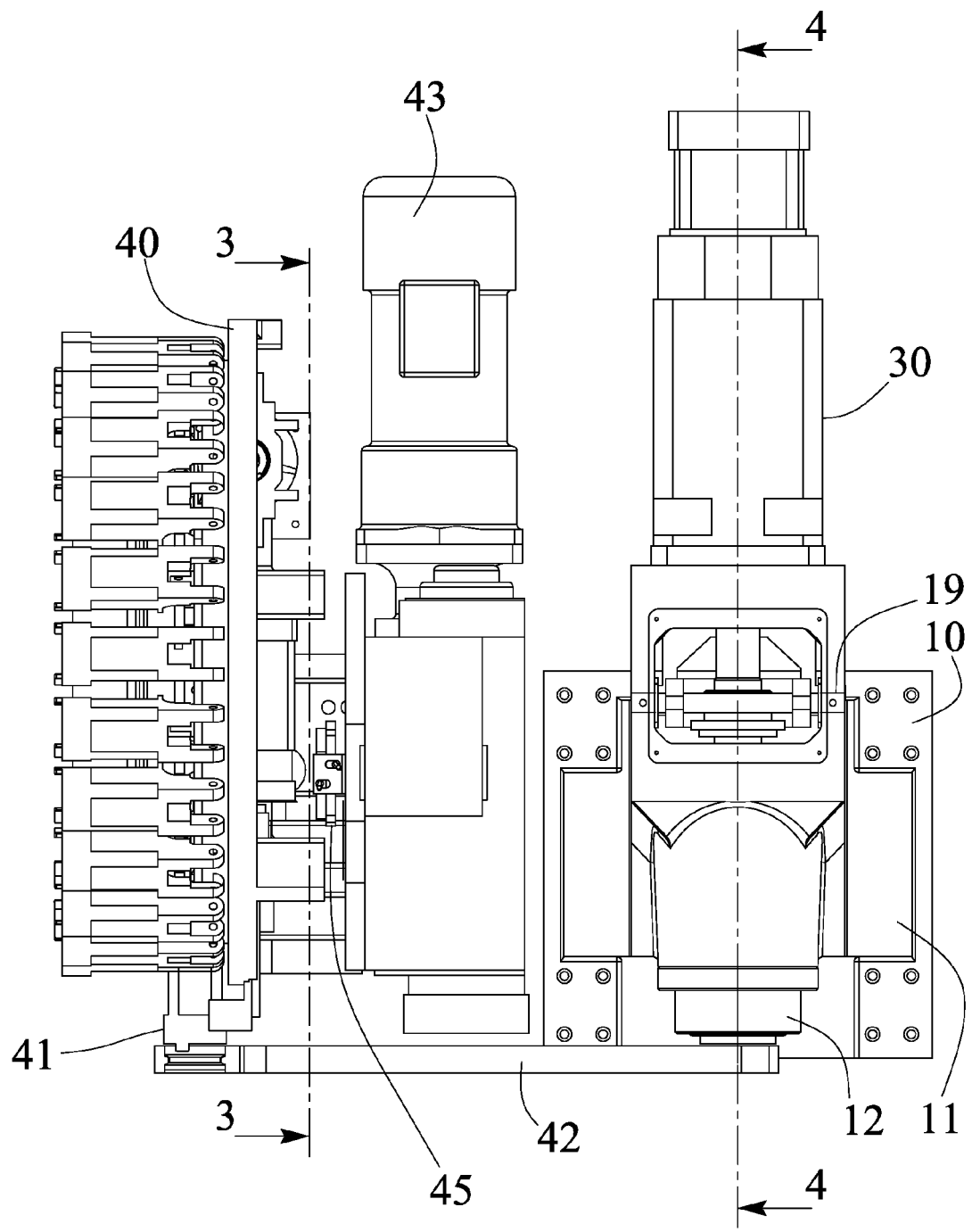
FIG. 2 is a front plan schematic view of the machine tool.

Referring to the drawings, and initially to FIGS. 1-4, a machine tool in accordance with the present invention comprises a machine body or column or stand 10 including a straight guide or guide rail or head or arm or support or receptacle 11 provided and attached or mounted or secured or supported on the stand 10 and extended forwardly from the stand 10, a working spindle 12 pivotally or rotatably attached or mounted or secured or disposed or engaged in the receptacle 11 (FIGS. 4, 6) with one or more bearing members 13 (FIG. 6) and having a bore 14 formed therein, and having an engaging hole 15 formed therein, such as formed in the lower or bottom portion thereof and communicating with the bore 14 thereof for receiving or carrying or supporting or engaging with a working tool member or element 90 therein.

Figure 6:
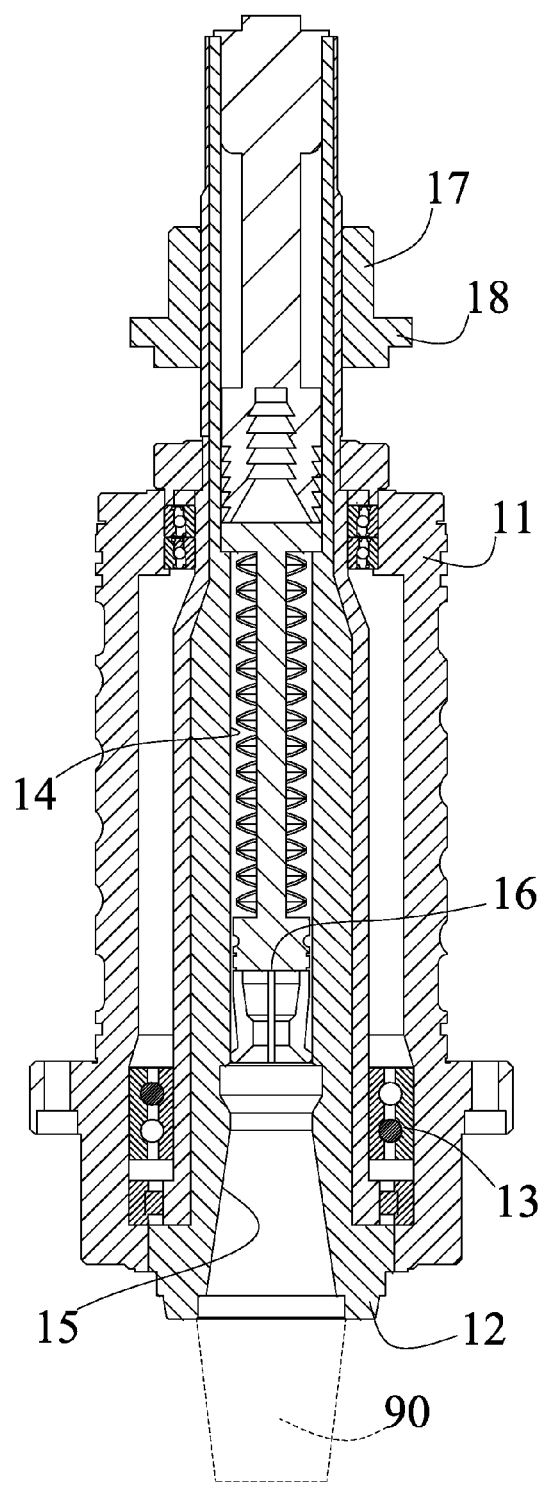
FIG. 6 is a further partial cross sectional view illustrating a working spindle of the machine tool.
Figures 7, 8:
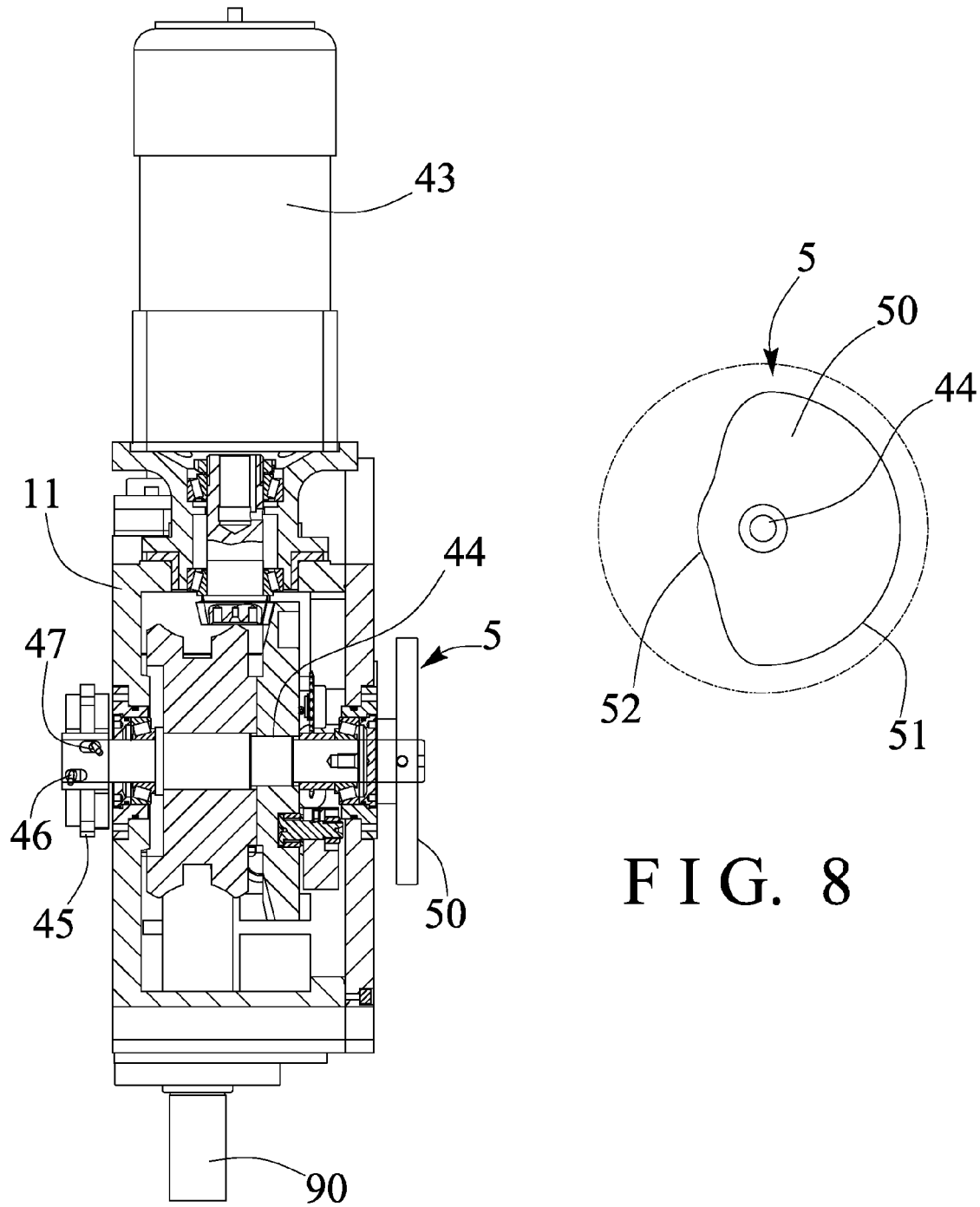
FIG. 7 is a still further partial cross sectional view similar to FIG. 5, illustrating the other arrangement of the machine tool.
FIG. 8 is a partial plan schematic view illustrating a cam member of the machine tool.
Figure 9:
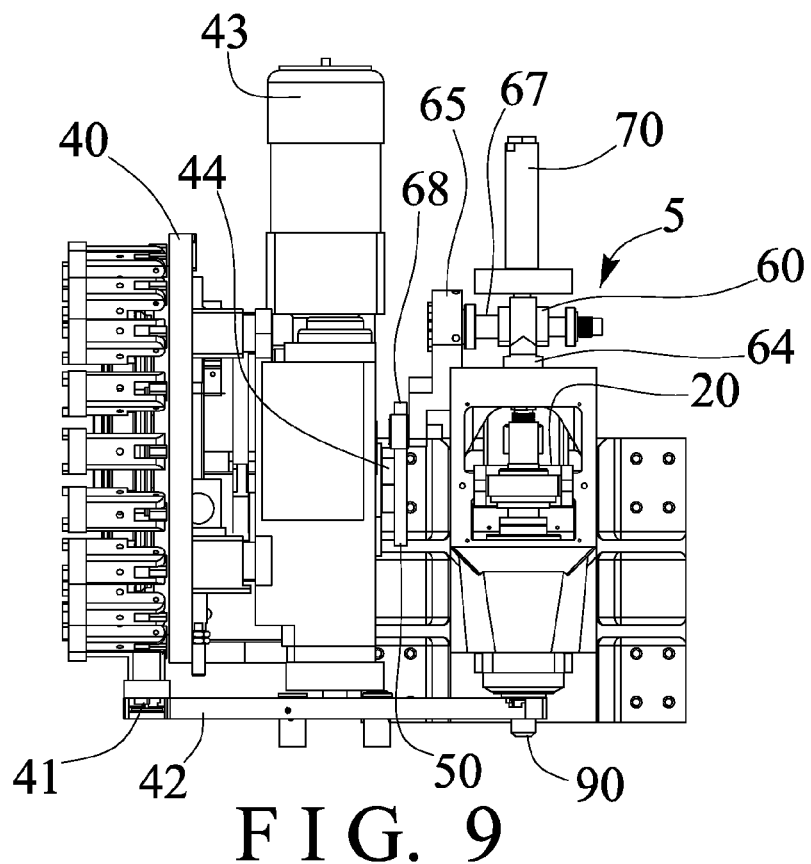
FIGS. 9, 10 are still further partial cross sectional views illustrating the operation of the machine tool.
Figure 10:
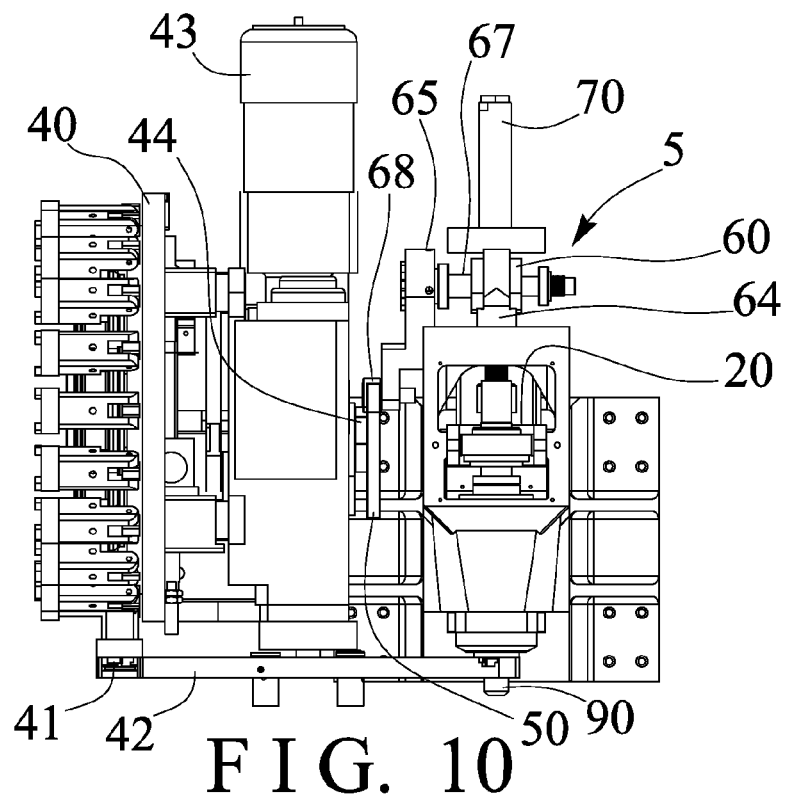
Figure 11:
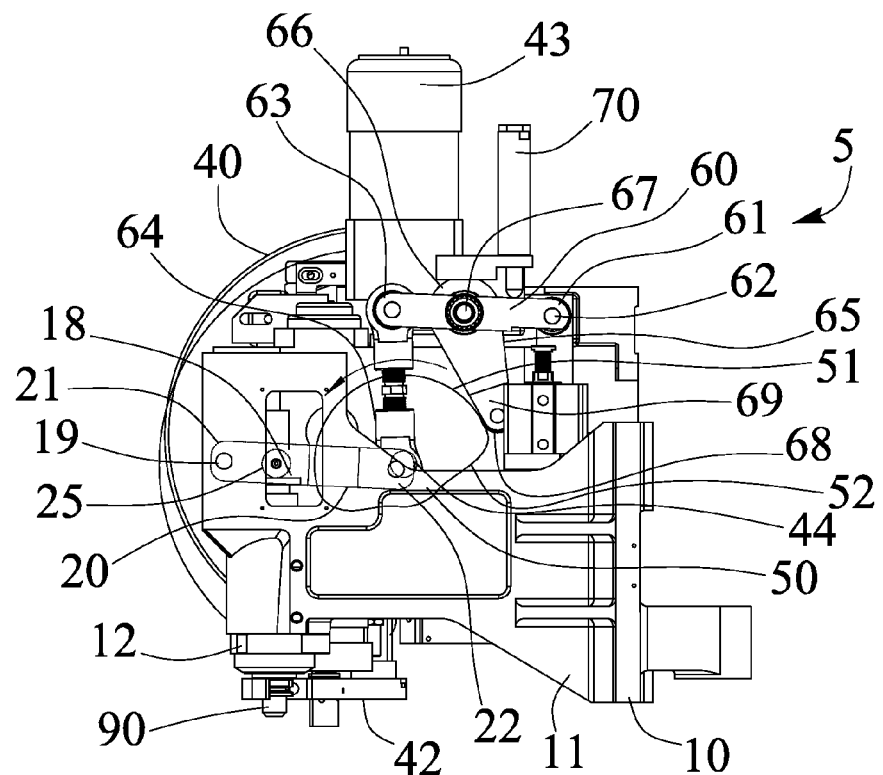
FIGS. 11, 12 are partial side plan schematic views illustrating the operation of the machine tool as shown in FIGS. 9 and 10 respectively.
Figure 12:
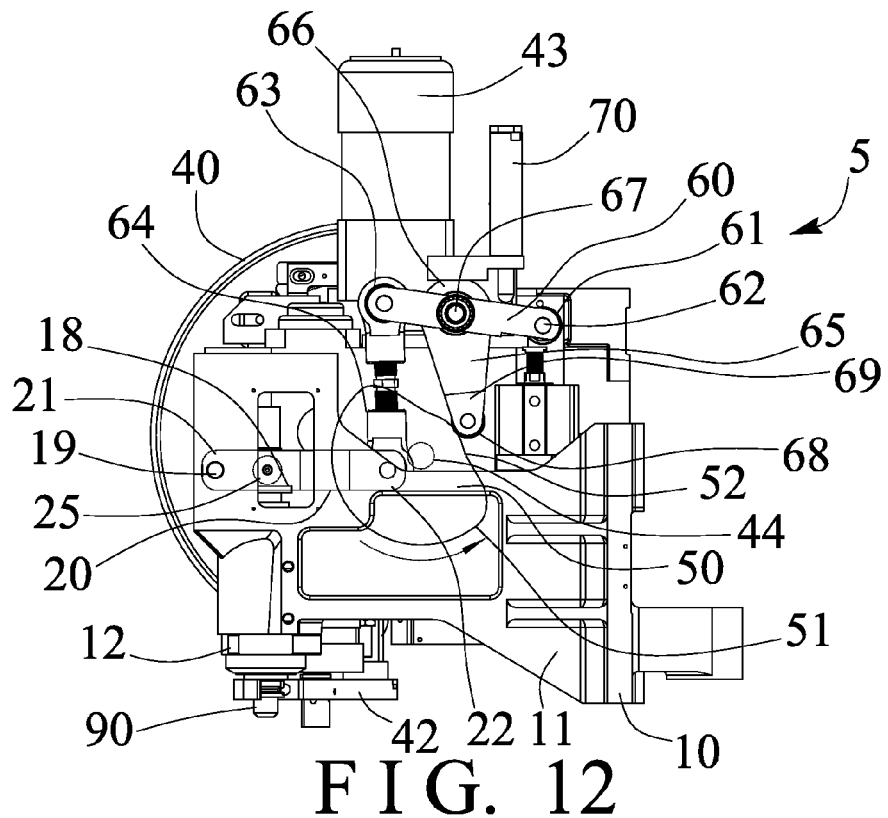

As shown in FIG. 6, a spring biased gripping or chuck device 16 is slidably received or engaged in the bore 14 of the working spindle 12 for selectively gripping or grasping or releasing or engaging with the tool member 90, and a sleeve or collar or barrel or follower 17 is slidably attached or mounted or secured or engaged onto the working spindle 12 and moveable up and down relative to the working spindle 12 and secured or engaged with or coupled to the spring biased chuck device 16 for selectively actuating or operating the chuck device 16 to grip or grasp the tool member 90 or to release the tool member 90 when required, and the follower 17 includes a peripheral skirt or rib or flange 18 extended radially and outwardly therefrom. The engagement or connecting or coupling of the follower 17 to the chuck device 16 is typical and will not be described in further details.

A lever arm 20 includes a front or one or first end portion 21, such as a bifurcated end portion 21 pivotally or rotatably attached or mounted or secured to the receptacle 11 with a spindle or axle 19, and includes a rear or other or second end portion 22, such as a bifurcated end portion 22 movable or slidable or pivotal up and down relative to the receptacle 11, a spring biasing member 23 (FIG. 4) is disposed or engaged in the receptacle 11 and engaged with the lever arm 20, such as the rear or other or second end portion 22 of the lever arm 20 for biasing and forcing or moving or pivoting or rotating or recovering the rear or other or second end portion 22 of the lever arm 20 upwardly relative to the receptacle 11. A roller or pulley or wheel 24 (FIG. 4) is pivotally or rotatably attached or mounted or secured to the rear or other or second end portion 22 of the lever arm 20.

A bearing or pulley or roller or wheel or actuator 25 is attached or mounted or secured to the lever arm 20, such as located close to the first end portion 21 of the lever arm 20 (FIGS. 1, 3-4) for selectively contacting or engaging with the follower 17, such as the peripheral flange 18 of the follower 17 (FIG. 4) for selectively actuating or operating the follower 17 to operate or actuate the chuck device 16 to grip or grasp the tool member 90 or to release the tool member 90. For example, when the second end portion 22 of the lever arm 20 is moved downwardly relative to the receptacle 11, the actuator 25 may also be moved downwardly to actuate or move the chuck device 16 downwardly to release the tool member 90. The chuck device 16 may be biased and moved upwardly to grip or grasp the tool member 90 when the second end portion 22 of the lever arm 20 and the actuator 25 are biased and moved upwardly by the spring biasing member 23.

A motor or actuator or cylinder or driving device 30 is disposed or attached or mounted or secured on top of the stand 10 and/or the receptacle 11, and may be selected from a pneumatic motor, a step motor or the like, and includes a piston 31 slidably disposed or received or engaged therein and disposed or located above the second end portion 22 of the lever arm 20 and/or the wheel 24 for selectively contacting or engaging with the wheel 24 and/or the second end portion 22 of the lever arm 20 and for selectively actuating or operating or forcing or moving the second end portion 22 of the lever arm 20 downwardly relative to the receptacle 11, in order to selectively force or move the actuator 25 to actuate or move the chuck device 16 downwardly to release the tool member 90. When the piston 31 is moved upwardly away from the wheel 24 and/or the second end portion 22 of the lever arm 20, the spring biasing member 23 may bias and move the second end portion 22 of the lever arm 20 and the actuator 25 upwardly relative to the receptacle 11.

A tool carrier or housing or cartridge 40 is provided for carrying or supporting spare tool members or elements 41 thereon and for selectively or changeably supplying or feeding or fitting the spare tool members or elements 41 to the working spindle 12 and for allowing the selected or predetermined or required spare tool element 41 to be suitably changed and fitted to the working spindle 12 selectively when the tool member 90 is no longer required to be used or when the tool member 90 is required to be changed or replaced with the spare tool element 41. A bar or rod or beam 42 is further provided and held or supported between the tool cartridge 40 and the working spindle 12 for moving or changing or replacing the tool member 90 with the spare tool element 41, or for selectively changing or feeding or fitting the spare tool element 41 to the working spindle 12.

For example, another driving device or cylinder or actuator or motor 43 is disposed or attached or mounted or secured on top of the stand 10 and/or the receptacle 11, and may also be selected from a pneumatic motor, a step motor or the like, and may be coupled to the beam 42 for moving and/or pivoting and/or rotating the beam 42 relative to the receptacle 11 and the working spindle 12 for selectively changing or feeding or fitting or moving or replacing the tool member 90 with the spare tool element 41, when required. The connecting or engagement or coupling of the driving device or cylinder or actuator or motor 43 to drive or move or actuate or operate the beam 42 is not related to the present invention and will not be described in further details.

Figure 3:
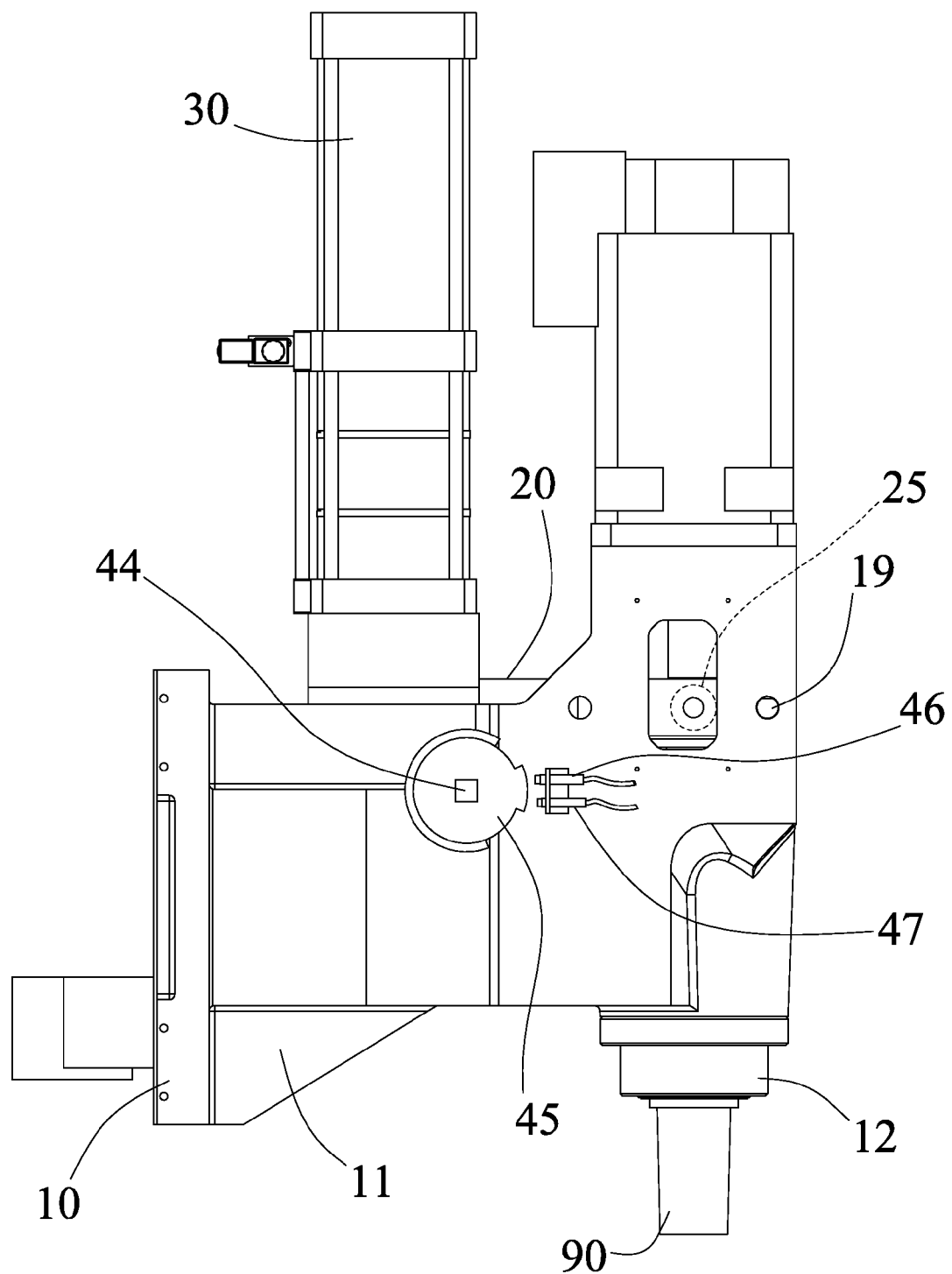
FIGS. 3, 4 are partial cross sectional views of the machine tool, taken along lines 3-3 and 4-4 of FIG. 2 respectively.
Figure 5:
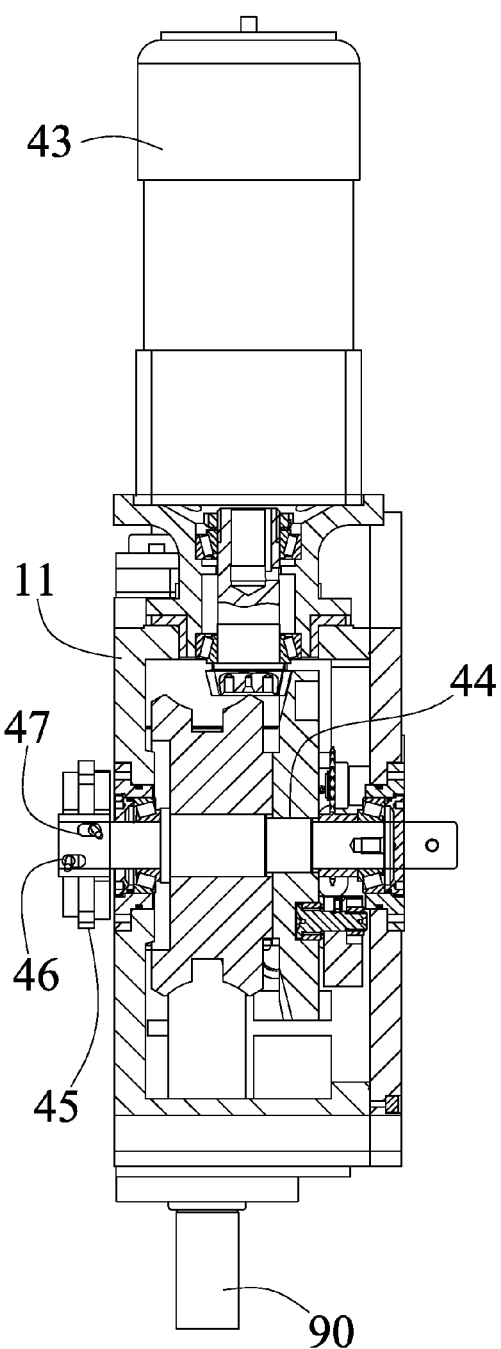
FIG. 5 is another partial cross sectional view illustrating a tool changing operating device of the machine tool.

As shown in FIGS. 3 and 5, a pivot shaft 44 is attached or mounted or secured in the receptacle 11 and disposed or positioned or located below the motor 43, and coupled to the motor 43 and to be actuated or operated by the motor 43 in order to be pivoted or rotated or driven by the motor 43, for example, when the beam 42 is driven or actuated or operated by the motor 43, and a rotary or detecting wheel 45 (FIGS. 2, 3, 5) is attached or mounted or secured to the pivot shaft 44 and rotated in concert with the pivot shaft 44, one or more (such as two) sensors or detectors or control devices 46, 47 are further provided and disposed or positioned or located beside the pivot shaft 44 and/or the detecting wheel 45 for sensing or detecting the rotational movement of the pivot shaft 44 and/or the detecting wheel 45.

For example, the first control device 46 may be used to actuate or operate or control the motor 43 to operate or actuate the beam 42, in response to the rotational movement of the pivot shaft 44 and/or the detecting wheel 45, in order to selectively change or feed or fit or move or replace the tool member 90 with the spare tool element 41, and the second control device 47 may be used to actuate or operate or control the driving device 30 and/or the piston 31 to selectively actuate or operate or force or move the second end portion 22 of the lever arm 20 downwardly relative to the receptacle 11, in order to selectively force or move the actuator 25 to actuate or move the follower 17 and the chuck device 16 downwardly to release the tool member 90. The detecting wheel 45 and/or the control devices 46, 47 may be coupled to a controlling or processing unit or device or the like (not shown).

Figure 4:
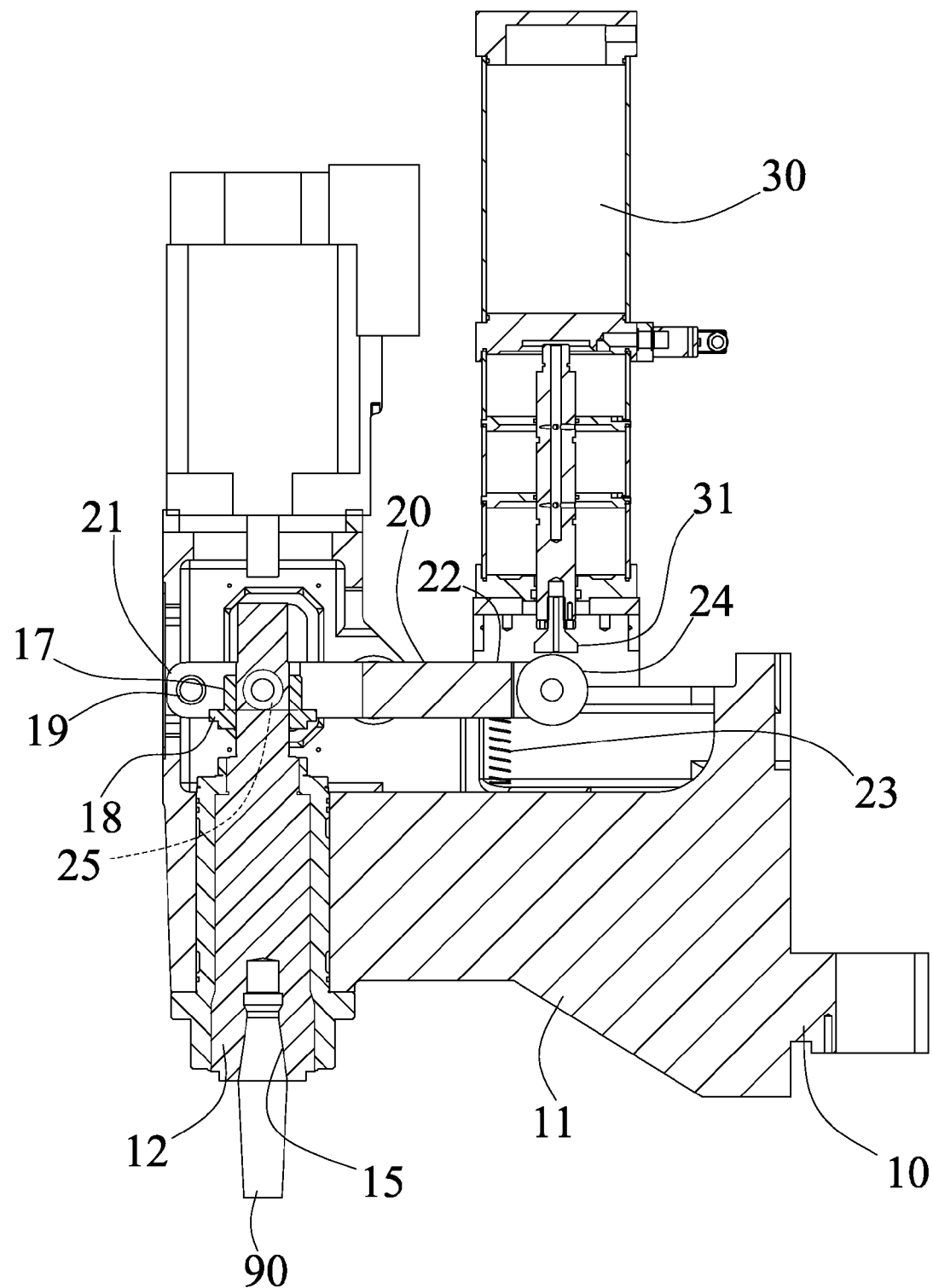

In operation, as shown in FIG. 4, the wheel 24 and/or the second end portion 22 of the lever arm 20 may be biased and pivoted or rotated or moved upwardly relative to the stand 10 and the receptacle 11 by the spring biasing member 23, and the actuator 25 may be forced to move upwardly away from the peripheral flange 18 of the follower 17 which may release the chuck device 16 for allowing the chuck device 16 to grip or grasp the tool member 90 to the working spindle 12. The driving device 30 may selectively actuate or operate or force the piston 31 to move the wheel 24 and/or the second end portion 22 of the lever arm 20 downwardly relative to the stand 10 and the receptacle 11 and to depress or compress the spring biasing member 23, and the actuator 25 may also be forced to move downwardly to selectively contact or engage with the peripheral flange 18 of the follower 17 and to selectively actuate or operate the follower 17 to operate or actuate the chuck device 16 to release the tool member 90 from the working spindle 12. The control devices 46, 47 may actuate or operate or control the motor 43 to operate or actuate the beam 42 and to control the driving device 30 and/or the piston 31 to move the second end portion 22 of the lever arm 20 downwardly relative to the receptacle 11, in response to the rotational movement of the pivot shaft 44 and/or the detecting wheel 45, in order to change the tool member 90 with the spare tool element 41.

As shown in FIGS. 7-12, for safety purposes, the machine tool may further include an additional driving or actuating motor or device 5 arranged for moving and/or pivoting and/or rotating the lever arm 20 relative to the receptacle 11 and the working spindle 12 in order to selectively force or move the actuator 25 to actuate or move the chuck device 16 downwardly to release the tool member 90. For example, the actuating device 5 includes a cam member 50 attached or mounted or secured to the pivot shaft 44 (FIG. 7) and rotated in concert with the pivot shaft 44, and the cam member 50 includes a curved or circular outer peripheral portion or surface 51 having a relatively greater outer diameter, and a cam portion or surface 52 having a relatively smaller outer diameter than that of the circular outer peripheral surface 51, best shown in FIG. 8.

As shown in FIGS. 9-12, the actuating device 5 includes a bar or rod 60 having one or first end portion 61 pivotally or rotatably attached or mounted or secured to the receptacle 11 with a spindle or axle or pivot pin 62, and another or second end portion 63 pivotally or rotatably attached or mounted or secured or coupled to the other or second end portion 22 of the lever arm 20 with a link 64 for allowing the other or second end portion 22 of the lever arm 20 and the actuator 25 to be selectively pivoted or rotated or moved up and down relative to the receptacle 11 by the pivoting or rotating movement of the rod 60 relative to the receptacle 11. A bar 65 includes one or first end portion 66 attached or mounted or secured to the rod 60 with a latch or fastener 67 and rotated in concert with the rod 60, and includes a pulley or bearing or wheel or actuator or roller 68 attached or mounted or secured to the other or second end portion 69 of the bar 65 for selectively contacting or engaging with the circular outer peripheral surface 51 or the cam surface 52 of the cam member 50.

A spring biased pressing member or tongue or element or mechanism or device 70 may further be provided and disposed or positioned or located above the rod 60 for selectively contacting and engaging with the rod 60 and for biasing or pivoting or rotating or recovering and forcing or moving the rod 60 and the link 64 downwardly relative to the receptacle 11 and for selectively pivoting or rotating or moving the roller 68 or the other or second end portion 69 of the bar 65 to selectively contact or engage with the circular outer peripheral surface 51 or the cam surface 52 of the cam member 50 and thus for selectively pivoting or rotating or moving the other or second end portion 22 of the lever arm 20 and the actuator 25 to selectively actuate or move the chuck device 16 downwardly to release the tool member 90.

The other or second end portion 22 of the lever arm 20 and the actuator 25 may be selectively actuated or moved upwardly or away from the follower 17 and the flange 18 and the chuck device 16 when the roller 68 or the other or second end portion 69 of the bar 65 is selectively contacted or engaged with the circular outer peripheral surface 51 of the cam member 50, and may be selectively actuated or moved toward and to selectively contact or engage with the flange 18 or the follower 17 and thus to selectively pivot or rotate or move or actuate or operate the chuck device 16 to grip or grasp the tool member 90 or to release the tool member 90 when the roller 68 or the other or second end portion 69 of the bar 65 is selectively contacted or engaged with the cam surface 52 of the cam member 50.

Accordingly, the machine tool in accordance with the present invention includes a tool changer or tool changing mechanism for suitably and stably and smoothly replacing and changing tool members or elements to a working spindle and for allowing the tool members or elements to be stably and smoothly and effectively replaced and changed with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A machine tool comprising:
a stand,
a receptacle provided on said stand, said receptacle including a pivot shaft,
a detecting wheel attached to said pivot shaft and rotated in concert with said pivot shaft,
a working spindle rotatably attached to said receptacle and including a chuck device for grasping and releasing a tool member from said working spindle,
a follower slidably attached onto said working spindle and moveable up and down relative to said working spindle for actuating said chuck device to selectively grasp or release said tool member,
a lever arm including a first end portion pivotally attached to said receptacle with an axle, and said lever arm including a second end portion movable up and down relative to said receptacle,
an actuator attached to said lever arm for selectively contacting and engaging with said follower and for selectively actuating said follower to operate said chuck device to grasp and to release said tool member from said working spindle, a spring biasing member disposed in said receptacle and engaged with said lever arm for biasing and moving said second end portion of said lever arm upwardly relative to said receptacle and for selectively biasing and moving said actuator away from said follower of said working spindle, a driving device attached to said receptacle and including a piston for selectively contacting and engaging with said second end portion of said lever arm and for selectively actuating and moving said second end portion of said lever arm downwardly relative to said receptacle to compress said spring biasing member and to force and move said actuator to engage with said follower and to selectively actuate and move said chuck device to release said tool member, and a control device disposed beside said detecting wheel for detecting a rotational movement of said pivot shaft and said detecting wheel and for selectively actuating said piston of said driving device to engage with said second end portion of said lever arm.

2. The machine tool as claimed in claim 1, wherein said lever arm includes a wheel attached to said second end portion of said lever arm for selectively contacting and engaging with said piston of said driving device.

3. The machine tool as claimed in claim 1, wherein said follower includes a peripheral flange extended therefrom for selectively contacting and engaging with said actuator.

4. The machine tool as claimed in claim 1, wherein said receptacle includes a tool cartridge for supporting at least one spare tool element thereon, and said receptacle further includes a beam supported between said tool cartridge and said working spindle for selectively moving said at least one spare tool element to said working spindle and to replace said tool member.

5. The machine tool as claimed in claim 4, wherein said receptacle includes a motor attached to said receptacle and coupled to said beam for moving and rotating said beam relative to said receptacle and said working spindle.

6. The machine tool as claimed in claim 5, wherein said receptacle includes a pivot shaft, a detecting wheel attached to said pivot shaft and rotated in concert with said pivot shaft, and a control device disposed beside said detecting wheel for detecting a rotational movement of said pivot shaft and said detecting wheel and for selectively actuating said motor to operate said beam.

* * * * *